United States Patent [19]

Durwin et al.

[11] 4,012,154
[45] Mar. 15, 1977

[54] THREADLESS LOCKING DEVICE
[75] Inventors: Robert J. Durwin, Trumbull; Joseph H. Mancini, Shelton, both of Conn.
[73] Assignee: United Technologies Corporation, Hartford, Conn.
[22] Filed: Sept. 28, 1973
[21] Appl. No.: 401,799
[52] U.S. Cl. .............................. 403/261; 308/236; 403/370
[51] Int. Cl.² .......................................... F16B 21/00
[58] Field of Search .......... 403/261, 259, 369, 370, 403/16, 344, 332; 308/236

[56] References Cited
UNITED STATES PATENTS

| | | | |
|---|---|---|---|
| 2,278,625 | 4/1942 | Traylor et al. | 308/236 |
| 2,683,613 | 7/1954 | Streed, Sr. et al. | 285/413 |
| 3,434,747 | 3/1969 | Nichols | 403/16 |
| 3,867,871 | 2/1975 | Shore | 403/261 X |

FOREIGN PATENTS OR APPLICATIONS 1,093,047  11/1954  France ............... 403/261

Primary Examiner—Andrew V. Kundrat
Attorney, Agent, or Firm—Maurice B. Tasker

[57] ABSTRACT

A shaft bearing retention means comprises a segmented ring having a conical inner surface which is placed about a large diameter shaft having a corresponding conical indentation about its periphery to receive the ring. The segments are retained in assembled position on the shaft by joining pins extended through interengaging lapped tongues on the ends of each segment and by attaching one or more flanged retaining rings thereto by screws or bolts. Additional clamping screws or bolts pass through the retaining ring and are threaded into the segments, projecting beyond the latter so as to bear against a thrust ring through which the shaft passes. The axially adjustable thrust ring engages a bearing assembly which is fixed against axial movement by a shoulder on the shaft. Axial force is produced against the bearing assembly by the clamping bolts due to wedging action of the mating conical surfaces on the shaft and the segmented ring.

7 Claims, 8 Drawing Figures

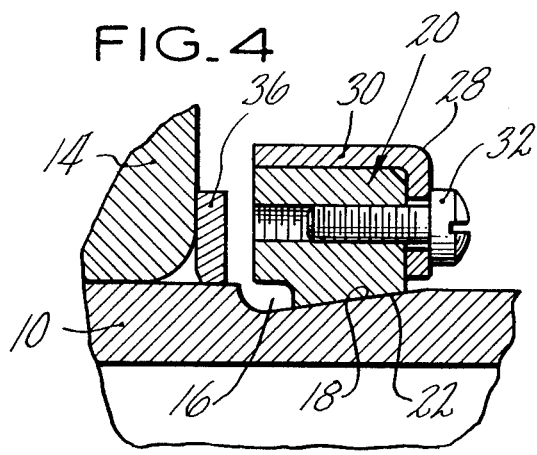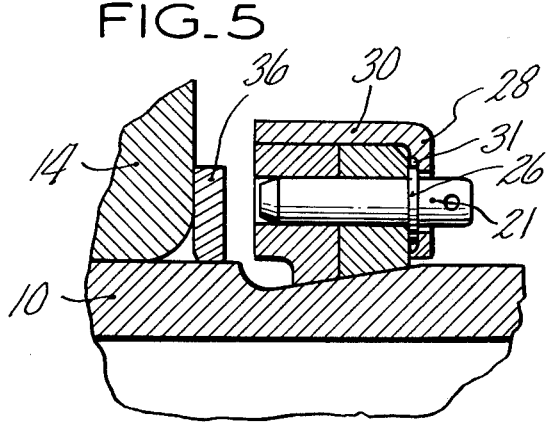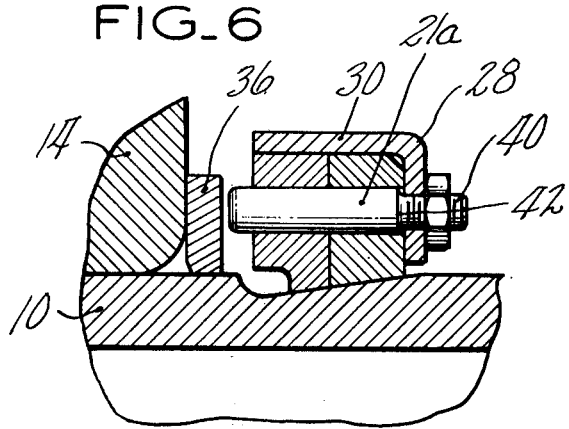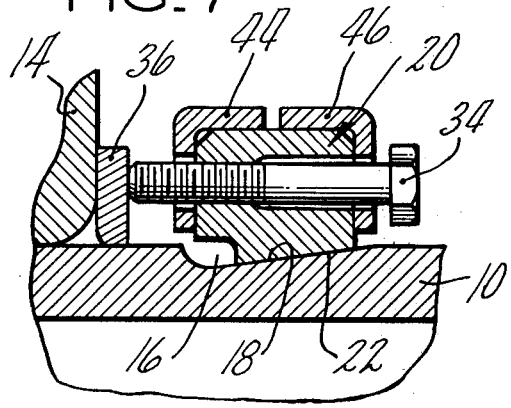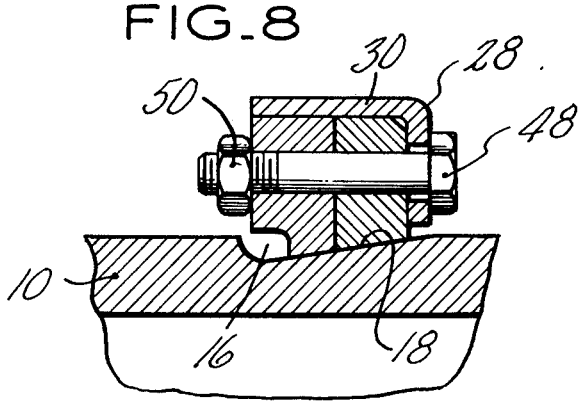

THREADLESS LOCKING DEVICE

The invention herein described was made in the course of or under a contract or subcontract thereunder with the Department of the Army.

BACKGROUND OF THE INVENTION

1. Field of the Invention

This invention relates to shaft bearing retention means and is particularly advantageous for use with large-diameter shafts and shafts wherein a threaded clamping nut cannot be passed over the shaft.

Heretofore it has been the practice to provide a threaded clamping ring, or nut, for the purpose of retaining a bearing assembly or a rotor hub on a large-diameter shaft. There are several disadvantages to this construction. Helicopter rotor drive shafts, for example, are relatively thin walled hollow shafts and when threaded such a shaft has a high stress concentration at the threaded section. Also threading a large-diameter shaft is expensive, requiring special manufacturing and inspection tools. Further, having to pass a nut over a long shaft limits design flexibility.

2. Prior Art Patents

U.S. Pat. No. 250,088, issued Nov. 29, 1881 to A. Loehner shows a shaft hanger and box having conical shaft supporting rings $m$ which are retained in position by a single piece retainer I. The radial clamping force exerted on the shaft by conical rings $m$ is varied by turning bolts $r$ which attach the aforementioned retainer I to a rigid support which has a conical surface corresponding to the conical rings $m$. The rings $m$ are not segmented, however, and do not engage a conical indentation in the shaft to produce axial thrust.

U.S. Pat. No. 903,280, issued Nov. 10, 1908 to G. P. Youmans shows a pipe coupling in which a segmented flange 5 is retained about a pipe by a single retaining ring, or hoop 2.

U.S. Pat. No. 2,683,613, issued July 13, 1954 to O. V. Streed, Sr. et al shows a pipe coupling comprising two segmented flanges having a conical surface on their inner peripheries corresponding to similar surfaces on the outer surfaces of adjacent pipe sections. The two flanges are bolted together.

U.S. Pat. No. 3,112,941, issued Dec. 3, 1963 to W. J. Dutton, shows a rotor shaft and hub with a threaded nut on the shaft for holding the hub in which the hub and shaft have conical surfaces and clamping bolts on the nut cooperate with the conical surfaces to clamp the hub to the shaft. This construction does not eliminate the threaded nut.

The above prior art patents are made of record because they show elements of the bearing retention means of the present invention used in different but somewhat related arts.

SUMMARY OF THE INVENTION

It is an object of this invention to provide a retention means for a bearing mounted on a large-diameter shaft which may be of considerable length in which the usual clamping member threaded on the external periphery of the shaft is eliminated.

More specifically it is an object of this invention to provide a segmented ring having a conical inner surface which is assembled on the shaft and has its inner periphery received in an annular conical indentation in the exterior surface of the shaft. The segments are retained in their assembled position on the shaft by joining pins passing through half lap joints at the ends of adjacent segments and by a single piece retaining ring attached to the segmented ring by screws or bolts which has an annular flange overlying the periphery of the segmented ring. Additional bolts are provided which pass through the retaining ring and are threaded into the segments and bear against a rigid thrust ring through which the shaft passes and which itself bears against the bearing assembly to be retained in position on the shaft.

BRIEF DESCRIPTION OF THE DRAWINGS

FIG. 4 is a section on line 4—4 of FIG. 1;
FIG. 5 is a section on line 5—5 of FIG. 1;
FIG. 6 is a section on line 5—5 of FIG. 1 showing an alternate construction;
FIG. 7 is a section on line 3—3 of FIG. 1 showing another alternate construction;
and
FIG. 8 is a section on line 5—5 of FIG. 1 showing an alternate construction for joining the segments of ring 20.

DESCRIPTION OF THE PREFERRED EMBODIMENTS

Figure 1:
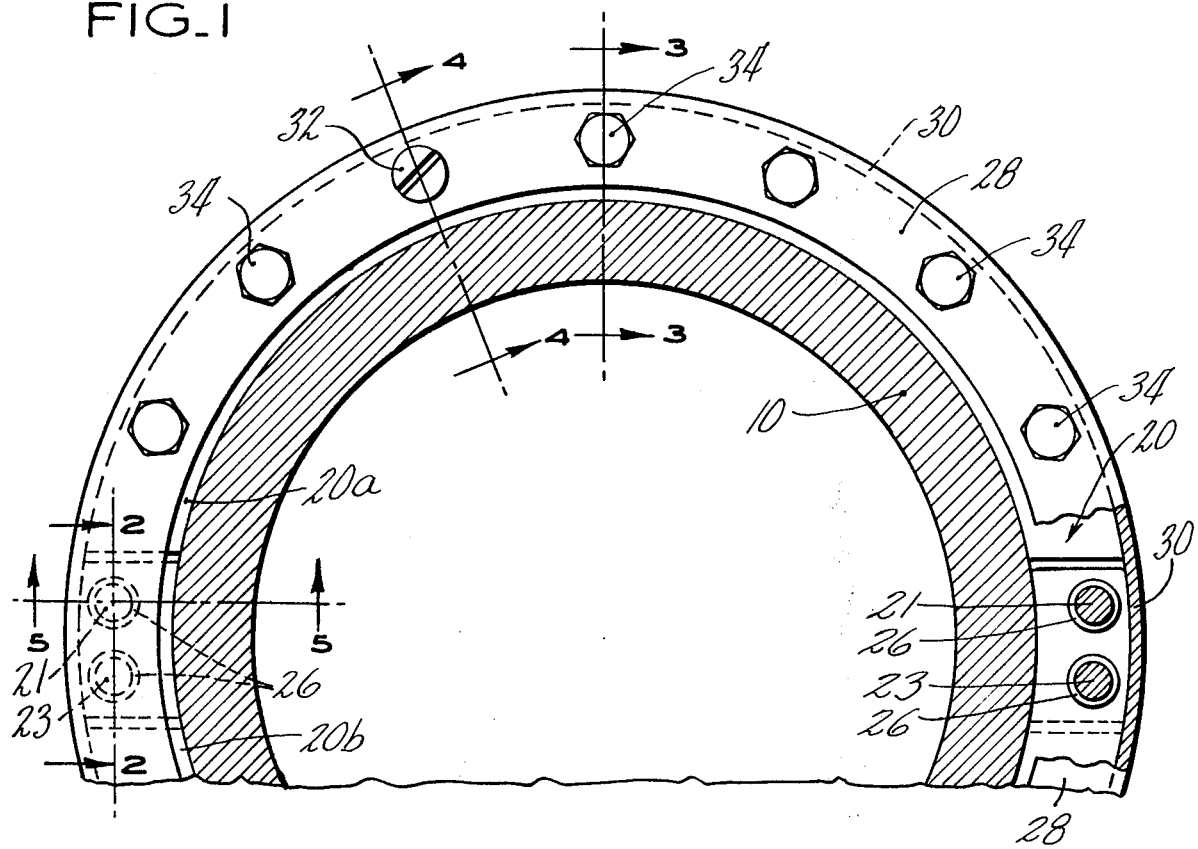
FIG. 1 is a sectional elevation of the bearing retention assembly of this invention, parts being omitted to facilitate illustration.

Referring first to FIGS. 1–5, a large-diameter hollow shaft 10 has an abutment 12 against which a bearing assembly 14 is seated. Shaft 10 is formed with a conical indentation 16, the inclined surface 18 of which confronts abutment 12. The split ring ball bearing assembly 14 is held forcibly in place against abutment 12 under preload by the improved bearing retention means of this invention which cooperates with the conical surface 18 of indentation 16 to hold the bearing assembly in place without the necessity for a locking ring threaded onto the shaft.

Figure 2:
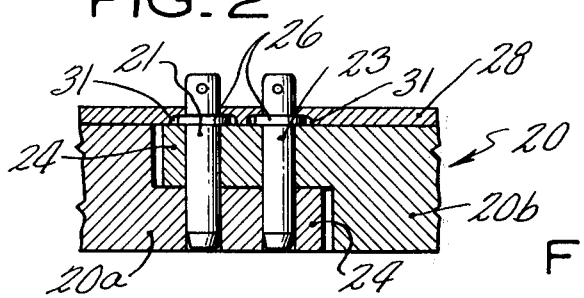
FIG. 2 is a section on line 2—2 of FIG. 1.
Figure 3:
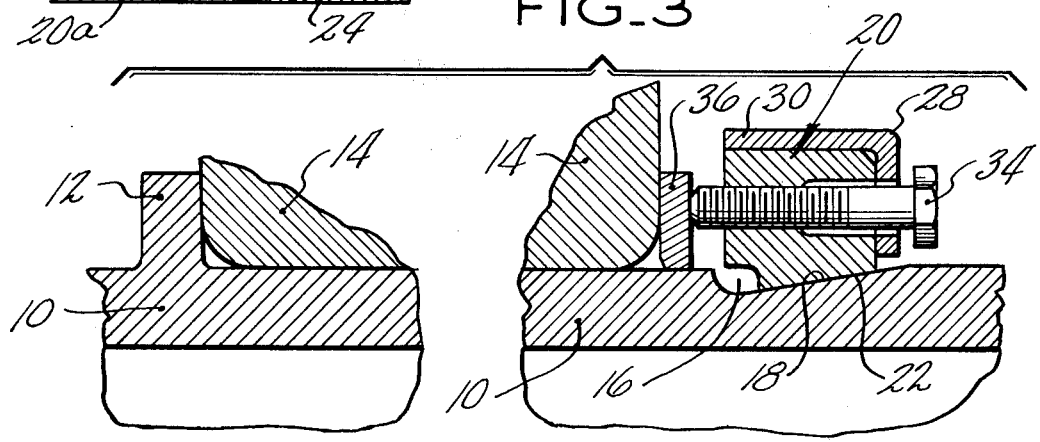
FIG. 3 is a section on line 3—3 of FIG. 1.

The retention means includes a segmented ring 20 having a conical inner surface 22 which corresponds to the surface 18 on shaft 10. Herein the ring is divided into two segments 20a and 20b, although it may be divided into three or more segments, as desired. The segments are connected at their contiguous ends by passing joining pins 21, 23 through interengaging lapped tongues 24 (FIG. 2) on each end of each segment. These pins are a close fit so that they react to the separating forces developed at the conical surfaces. The pins extend beyond ring 20 at one side of the latter as shown in FIG. 2 and are positioned by flanges 26 adjacent their extended ends which abut ring 20. The lapped ends of the segments form a half-lap end joint with the two joining pins extended through the mutually overlapping ends of adjacent segments.

The ring segments are further positioned by a single-piece retaining ring 28 which has a peripheral flange 30 closely embracing the periphery of the segmented ring, recesses 31 being provided in ring 28 where the latter overlies the segmented ring to receive flanges 26 on pins 21, 23. Retaining ring 28 is attached to both segments of ring 20 by cap screws 32, one of which is shown in FIG. 1, which pass through ring 28 and are threaded into the segments of ring 20.

The retention means thus far described forms a unitary ring-like structure, the inner peripheral surface of which seats on conical surface 18 of the shaft. A series of clamping bolts 34 extend into this ring-like structure and extend therebeyond to engage a rigid pressure ring 36. Bolts 34 are threaded into the segments of ring 20 and are long enough so their heads never seat against ring 28 but instead bear at their ends against pressure ring 36 (FIG. 3) to control the amount of clamping force exerted against bearing assembly 14 to preload the bearing.

The operation of the threadless shaft locking device will be clear from the above description of the structure. Due to the wedging action of the mating conical surfaces on shaft 10 and ring 20, the latter forms a rigid, fixed abutment enabling the clamping bolts 34 to apply the desired force against bearing assembly 14. As the ring-like assembly comprising ring 20 and the segment retaining ring 28 moves up on conical surface 18 on shaft 10 as a result of tightening bolts 34, the segments 20a and 20b are caused to expand into engagement with the joining pins 21 and 23 and with the flange 30 of ring 28 resulting in a very rigid unitary structure on shaft 10 from which to preload the bearing assembly 14.

In FIG. 6 a modified construction for joining pins 21, 23 of FIGS. 1–5 is shown in which the pins of these figures are replaced by pins 21a having a reduced diameter threaded portion 40 producing a shoulder 42. Threaded portion 40 extends through retaining ring 28 and the latter is clamped against shoulder 42 by a nut. The unattached end of pin 40 is extended beyond the segmented ring 20 to provide abutments for positioning ring 36 during assembly.

FIG. 7 shows the use of two confronting, flanged retaining rings 44, 46 in place of the single flanged ring 28. In this modification bolts 34 pass through ring 20 and ring 46 and are threaded into both ring 20 and ring 44 or into ring 20 only as shown. Ring 44 can be attached to ring 20 by means of a cap screw (not shown) similar to cap screw 32 shown in FIG. 4.

FIG. 8 shows a further modification of the means for joining the segments of ring 20, where space permits, in which bolts 48 with nuts 50 take the place of joining pins 21, 23. When this form of joining means is used the attachment screws 32 of FIGS. 1–5 form can be omitted.

From the above-detailed description, it will be evident that a locking device has been provided for a bearing assembly, or any other element which it is desired to lock to a shaft, which entirely eliminates the problems of a threaded ring nut and threaded shaft with all the difficulties associated with their use, of which the most important is the elimination of stress concentrations at the threads.

While we have described several embodiments in considerable detail, we do not wish to be limited to the precise constuctions illustrated, since many modifications will occur to persons skilled in this art which fall within the scope of the appended claims.

We claim:

1. In combination, a shaft having an annular indentation including a conical bottom surface, a segmented ring having a mating conical inner periphery adapted to be seated in said indentation, said segments having half-lap joints at their meeting ends, joining pins extending through the mutually overlapping ends of said segments, a retaining ring secured to a radial face of said segmented ring having a peripheral flange overlying and closely embracing the outer periphery of said segments, and clamping bolts located about the periphery of said rings extend through said rings in an axial direction and are threaded into said segments and extend therebeyond.

2. In combination, a shaft having an annular indentation including a conical bottom surface, a shoulder on said shaft spaced from said indentation on the side adjacent the small diameter of said conical surface, a segmented ring having a mating conical inner periphery seated on the conical surface in said indentation, the segments of said ring having half-lap joints at their meeting ends, joining pins extending through the mutually overlapping ends of said segments, a retaining ring secured to one radial face of said segmented ring having a peripheral flange overlying and closely embracing the outer periphery of said segmented ring, and preload bolts located about the periphery of said assembled rings which extend through the latter in an axial direction, are threaded into said segments and extend therebeyond toward the shoulder on said shaft.

3. In combination, a shaft having an annular indentation including a conical bottom surface, a segmented ring having a mating conical inner periphery adapted to be seated in said indentation, said segments having half-lap joints at their meeting ends, joining pins extended through the mutually overlapping ends of said segments having flanges at one end, and means for captivating said joining pins including a retaining ring secured to a radial face of said segmented ring and overlying said flanges on said pins.

4. The combination recited in claim 3 in which the flanges on said joining pins are received in recesses in one of the overlying surfaces of said retaining ring.

5. The combination recited in claim 3 in which said joining pins have a reduced threaded portion which extends through the retaining ring and the pins are secured by nuts on the extended ends of the pins.

6. The combination recited in claim 3 in which the joining pins comprise bolts extended through the segmented ring and the retaining ring and are secured by nuts on the threaded ends of said bolts.

7. In combination, a shaft having an annular indentation including a conical bottom surface, a segmented ring having a mating conical inner periphery adapted to be seated midway in said indentation, said segments having half-lap joints at their meeting ends, joining pins extending through the mutually overlapping ends of said segments, a retaining ring secured to one radial face of said segmented ring having a peripheral flange overlying and closely embracing the outer periphery of said segments, a second retaining ring on the opposite side of said segmented ring from said first retaining ring, and clamping bolts located about the periphery of said rings which extend through the latter and are threaded into said segmented ring.

* * * * *